Sept. 21, 1965 W. SCHREUER ETAL 3,207,992

OVERLOAD PROTECTION CIRCUIT

Filed March 31, 1961

WALTER SCHREUER
ALFRED R. JACKSON
*INVENTORS*

*BY* Alden D Redfield
Abraham Ogman
ATTORNEYS 3,207,992

OVERLOAD PROTECTION CIRCUIT

Walter Schreuer and Alfred R. Jackson, Ipswich, Mass., assignors to Avco Corporation, Cincinnati, Ohio, a corporation of Delaware Filed Mar. 31, 1961, Ser. No. 99,846
8 Claims. (Cl. 328—10)

Figure 1:
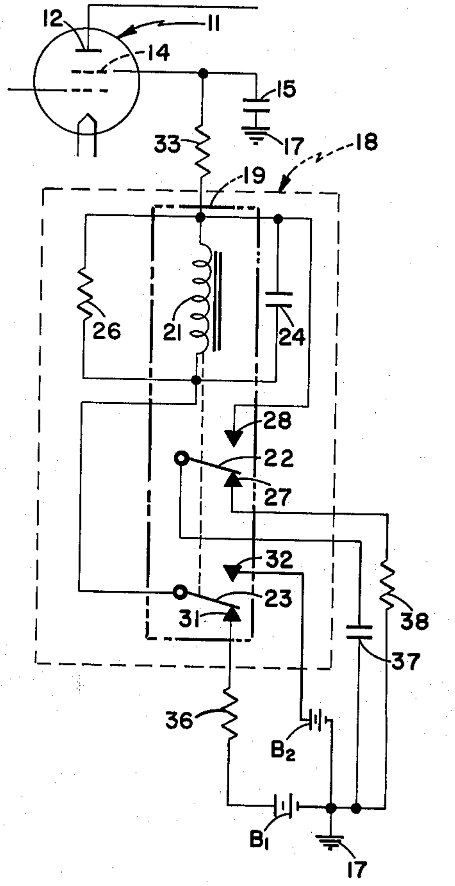

This invention relates to overload protection circuits and, in particular, to protection means for elements of electron discharge devices, such as screen grids of vacuum tubes. For purposes of this discussion, it will be understood that the term electron discharge device applies to vacuum tubes, gas filled electron tubes, and semiconductor devices, amongst others.

With the increased popularity of single sideband transmission, increased emphasis has been placed upon the use of linear or quasilinear amplifiers, such as Class A and Class AB amplifiers. Linear amplifiers, unlike the Class C amplifiers used widely in conventional broadcasting equipment, are extremely sensitive to variations in load. Load changes materially alter a tube operating condition; e.g., plate and screen currents.

Conventional power amplifiers generally use tetrode or pentode tubes, each including an anode or plate electrode and a screen grid, or second electrode. When, for any reason, the plate voltage (potential) drops below the screen grid potential, in a tetrode or pentode vacuum tube, the screen grid begins to act as the primary anode element and begins to draw extremely heavy current. This effect is more pronounced in tetrodes, since the tetrode tube does not include a supressor grid between the screen grid and the plate electrode to suppress secondary emission from the plate electrode to the screen.

The screen grid is, relatively speaking, a flimsy mechanical structure having a small mass. It is not made to, nor is it capable of, dissipating large quantities of heat. Since heating of the screen grid is proportional to the square of the current flowing therein, even a small increase of current above the screen grid's rated value can be harmful. A large excessive current will generally cause the screen to vaporize in a very short time. Adequate protective means must be provided in linear amplifiers.

In single sideband transmitters and, in particular, in the final power amplifier stage, it is very easy to bring about a catastrophic combination of plate and screen voltages. For example, the plate voltage swing is approximately proportional to its grid driving voltage. Thus, a power amplifier and/or an exciter malfunction may cause the plate voltage to swing below the screen grid voltage.

Accidental mistuning of the antenna and/or the final power amplifier stage can also bring about adverse operating conditions. Much work has been done in adapting single sideband techniques to portable and man-pack communications systems. In this connection, antenna mistuning is a major problem. Mistuning develops by passing the antenna close to any object where electrical constants differ from those of air, or by merely touching an antenna. These occurrences are difficult, if not impossible, to avoid. Whenever this mistuning is reflected as an increased impedance in the final power amplifier stage, unusually low plate potentials are encountered and the screen grids are endangered.

As discussed above, it is imperative to provide a means for protecting screen grids in pentodes and tetrodes in single sideband systems where linear and quasi-linear power amplifiers predominate.

Prior art protecting circuits, particularly for electron tube electrodes, are found in many forms. The most common form is the equivalent of a simple fuse or circuit breaker which responds to over current conditions to activate a switching circuit that disconnects the electrodes from their electrical power supply when the tube current, most of which goes to the plate electrode, is excessive. There are circuits which disconnect a screen grid from a power supply when plate current becomes excessive. The difference in concept between the systems just described and the requirements of a screen overload protection circuit are obvious.

The present invention recognizes the combination of factors peculiar to linear power amplifiers which endanger the screen grid electrodes of power amplifier tubes. It also recognizes, generally, the benefit that can be derived from providing a protection circuit for current carrying components which, in the course of an intermittent overload, will not seriously endanger the structure of operation of the component.

It is an object of the invention to provide an overload protection circuit which avoids the limitations and disadvantages of prior art circuits of this type.

It is another object of the invention to provide an overload protection circuit which is activated substantially instantaneously by an overload condition.

It is yet another object of the invention to provide an overload protection circuit which includes automatic reset means.

Other objects of the invention are to provide an overload protection circuit which:

(1) Requires an extremely small amount of power to operate, (2) Is peculiarly adapted for protecting screen grids from precipitous increases in current, such as occurs in linear and quasi-linear amplifiers, (3) Lowers the average power dissipated in the component, and (4) Does not substantially interfere with the transmission of intelligence when a nonrecurring and momentary overload condition is created.

The invention comprises in combination with an element, a screen grid for example that is to be protected from overload in current, a first electrical power supply means and a second electrical power supply means. There is also included a current operated switching means, comprising a relay having an energizing coil in the current circuit of the component. The energizing coil is normally coupled between the component and the first electrical power supply means.

Relay contact means, actuated by the energizing coil, are also provided. A first contact is placed in the current circuit of the energizing coil and screen grid for switching the screen grid from the first electrical power supply means to the second electrical power supply means. A second relay contact is also coupled to the energizing coil and activated thereby. Finally, a time varying impedance means, a condenser for example, coupled to the second electrical power supply means and the second electrical switch contact means, is provided. Provision is made to charge the condenser through the energizing coil after an overload to maintain the energizing coil energized, and consequently the relay activated for a predetermined time.

Figure 2:
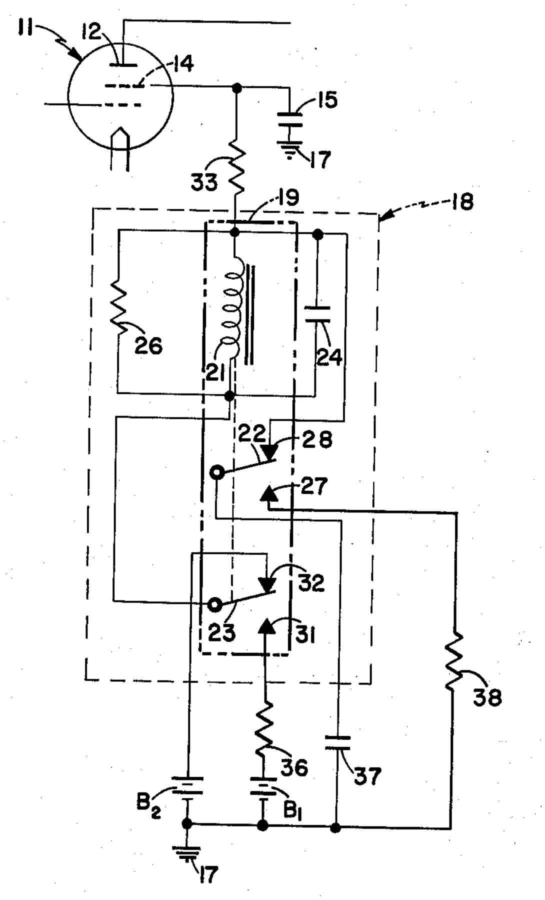

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a schematic representation of a screen grid overload protection circuit in its normal operating condition; and FIGURE 2 is a schematic representation of the FIGURE 1 circuit immediately after a current overload.

Referring to FIGURE 1 of the drawing, there is shown a schematic representation of a screen overload protection circuit embodying the principles of the present invention. The FIGURE 1 circuit includes an electron discharge device 11, shown as a conventional multi-grid vacuum tube. For purposes of this application, tube 11 is presumed to be the final power amplifier stage of a single sideband transmitter. The tube 11 includes a plate electrode 12 which is, in a conventional manner, coupled to an antenna system (not shown). There is also provided in tube 11 a screen grid 14. A condenser 15 is coupled between the screen grid 14 and a common reference potential, or ground 17.

Power is supplied to the screen from a first electrical power supply means $B_1$. A second electrical power supply means $B_2$ is also furnished. The manner in which it performs in the circuit will be explained hereinafter. Typically, the potential, voltage, of supply $B_2$ is substantially smaller than that of $B_1$.

In the current circuit for the screen 14 is a current operated switching means 18 comprising a relay 19 enclosed in the dot-dash outline, including an energizing means, preferably an electromagnetic coil 21, and associated relay contacts 22 and 23. As seen in FIGURE 1, switching means 18 also includes a condenser 24 and a resistor 26, both coupled in parallel across the energizing coil 21.

Relay contacts 22 and 23 are double pole single throw configurations. Relay contact 22 includes a normally closed terminal 27, and a normally open terminal 28. Similarly, relay contact 23 comprises a normally closed terminal 31 and a normally open terminal 32.

As noted in FIGURE 1, screen current flows through a resistor 33, a resistor 26 and energizing coil 21, in parallel, to relay contact 23. Assuming normal operating conditions, the current path, through relay contact 23, continues to terminal 31, through a resistor 36 to the electrical power supply means $B_1$.

It will be noted that a condenser 37 is coupled between ground 17 and terminal 27. A resistor 38 is coupled between ground 17 and terminal 27. The screen 14 is also coupled through resistor 33 to a terminal 28 of a relay contact 22. The circuit shown in FIGURE 1 and described above represents a normal operating condition.

Before discussing a typical operating cycle, several of the remaining components in the circuit will be discussed. Resistors 33 and 36 are current limiting and decoupling resistors for the screen. Under normal conditions, where the plate voltage is higher than the screen voltage, the screen 14 will draw a small amount of current and dissipate a small amount of heat, well within its heat dissipation capacity. Resistors 33 and 36 determine what the normal screen current is.

Condenser 15 is the conventional RF, or high frequency by-pass, condenser. Its function, as is typical, is to prevent radio frequency energy from being coupled to the electrical power supply means, $B_1$ in FIGURE 1.

Resistor 26 is provided to adjust the activating threshold. It diverts a portion of the screen current from the energizing coil 21, and thus controls the screen grid current level at which relay 19 is activated.

Assume a sudden overload condition arises in the screen. As discussed heretofore, an overload condition arises when the plate 12 voltage swings below the voltage of the screen grid 14. The screen grid 14 becomes the principal anode within the tube and diverts a large amount of current from the plate to itself. The excess screen current flows through resistor 33, energizing coil 21 and resistor 26, through contact 23 and resistor 36 to the electrical power supply means $B_1$. Assuming the magnitude of this screen current is above a predetermined threshold value, it will activate relay 19 by energizing the energizing coil 21, causing the relay contacts 22 and 23 to move from the normally closed position shown in FIGURE 1 to the position shown in FIGURE 2.

FIGURE 2, therefore, is a schematic representation of the overload protection circuit connections immediately following excessive screen current, which activated relay 19. It will be noted that the screen grid 14 is now coupled through the power supply means $B_2$ through resistor 33 and switching means 18. The potential of the power supply means $B_2$ is very low, in the order of 10% of the normal operating power supply means $B_1$ for example. The screen grid 14, operating at the sharply reduced voltage, reduces the current flow in the tube to the anode 12 and to itself to minimal proportions; thus, the act of disconnecting this screen from its normal potential $B_1$ and connecting it to the lower potential $B_2$ prevents the screen grid 14 from vaporizing because of the previously mentioned overload condition.

Since the screen is a fragile structure, the aforementioned switching operation must occur very rapidly. The switching time is determined primarily by the ballistics of the relay 19 and, in one case, was found to be as low as 2 milliseconds.

It is quite obvious that with the drop in screen current due to the screen grid 14 being connected to the low voltage power supply means $B_2$, energizing coil 21 would immediately de-energize and deactivate relay 19 unless some means was provided for keeping an energizing current flowing through the energizing coil 21. Such a means consists of the condenser 37 which is coupled in parallel across the series combination of the energizing coil 21 and the low voltage power supply means $B_2$. For all intents and purposes, the condenser 24 can be ignored at this time.

Condenser 37 is a time varying impedance. Prior to its being coupled to the energizing coil 21, it was coupled in parallel across resistor 38 and maintained at ground 17 potential (see FIGURE 1). Thus, when condenser 37 is coupled across the energizing coil 21 and the low voltage power supply means $B_2$, it starts to charge up to the $B_2$ potential. As is well-known, the condenser charging current decreases exponentially from an initial value which, initially, is more than adequate to maintain relay 19 activated. The rate at which the current falls off from its initial high value is determined by the time constant RC where R is the resistance of the energizing coil 21 and resistor 26 is parallel and C is the capacitance of condenser 37.

At some point during the charging cycle of condenser 37, the current flowing therein and consequently through the energizing coil 21 will decrease to a point where the current in the energizing coil 21 is unable to maintain the relay 19 activated. At this time, the relay contacts 22 and 23 will revert to the normal condition shown in FIGURE 1.

A 30 millisecond energized interval was found to be effective. Thus, the ratio of the time during which the screen grid 14 is connected to the low voltage power supply means $B_2$ with respect to the time that the screen grid 14 is connected to its normal supply means $B_1$, during an overload condition, is 15. Thus, the average value of the screen grid current is reduced to approximately $\frac{1}{15}$ of the overload value.

In the event the overload condition is more than a momentary phenomena and persists when the screen grid 14 is reconnected to its normal power supply means $B_1$, the above sequence of events leading to reactivation of relay 19 will recur. In the presence of a persistent overload, the on-off cycle described above will recur repeatedly.

The condenser 24, in parallel with the energized coil 21, is provided to prevent a surge of current through the energizing coil 21 when the screen grid 14 is reconnected to its normal power supply means $B_1$. A surge of current would occur since the by-pass condenser 15 tends to charge from the low voltage potential $B_2$ to the high voltage potential $B_1$.

Condenser 15 has a relatively small capacitance. The capacity of condenser 24 is at least 10 times higher than the capacity of the condenser 15 and thus can accept the surge of current without causing an appreciable voltage drop across itself and consequently energizing coil 21 in parallel with it. Condenser 24 thus makes relay 19 insensitive to switching transients.

An interesting feature of the screen overload protection circuit described above is its ability to minimize interference with the transmission of intelligence in the presence of momentary and isolated overload conditions. It will be noted that a typical cycle lasts approximately 32 milliseconds. An overload condition lasting two or three cycles or 100 milliseconds will not seriously interfere with the intelligibility of a transmission. This is a highly beneficial feature since a person operating a pack set, strapped to his back, will very likely, in the course of his moving about, pass close to metallic members such as trucks and buildings. He may also brush the antenna against grounded objects such as trees. Any of the foregoing events will cause the plate impedance to increase and cause the plate voltage to drop below the screen voltage creating an overload condition in the screen. In the event the transmitter remains close to the disturbing structure over an appreciable length of time, the present invention provides protection against a catastrophic failure. In the event the disturbance is momentary, there is no serious interruption of the transmission.

The various features and advantages of the invention are thought to be clear from foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A current overload protection circuit for an electron tube grid comprising: a first electrical power supply means normally coupled to the grid; a second electrical power supply means; current operated switch means in the current path of the grid activatable by current overloads in said grid for switching the grid from said first electrical power supply means to said second electrical power supply means; and means coupled to said switch means and said second electrical power supply means for maintaining said switch means activated for a predetermined time interval.

2. A current overload protection circuit as described in claim 1 in which said last mentioned means comprises a time varying impedance for reducing the current flowing through said current operated switch means as a function of time.

3. A current overload protection circuit as described in claim 1 in which said second electrical power supply means comprises a low potential means and the last mentioned means comprises a condenser coupled across the series combination of said second electrical power supply means and said current operated switch means.

4. A current overload protection circuit for an electron tube grid comprising: first electrical power supply means normally coupled to the grid means, when coupled to said grid, for reducing the current flowing therein; current operated switch means in the current path of the grid activatable by current overloads in said grid for switching the grid from said first electrical power supply means to said current reducing means; and means coupled to said switch means and said current reducing means for maintaining said switch means activated for a predetermined interval.

5. A current overload protection circuit for an electron tube grid comprising: first electrical power supply means normally coupled to the grid, a second and low potential electrical power supply means; current operated relay means activatable by current overloads in the grid for switching the component from the first electrical power supply means to the second electrical power supply means; time variable impedance means coupled to said second power supply means and said relay means for maintaining the relay activated for controlling the current in said relay for a predetermined interval after the overload arises.

6. A current overload protection device as described in claim 5 in which said time varying impedance means comprises a condenser coupled across the series combination of said relay means and said second electrical power supply means.

7. A current overload protection circuit for an electrode of an electron tube comprising a plate electrode, a grid electrode, and a cathode electrode comprising: a first electrical power supply means normally coupled to one of said electrodes; a second and lower voltage power supply means; current operated switch means in the current path of said one electrode activatable by current overloads in said one electrode for switching said one electrode from said first electrical power supply means to said second electrical power supply means, said current operated switch means including parallel connected relay and resistance means; and time varying impedance means coupled to said current operated switch means and said second power supply means for maintaining the current operated switch means activated for a predetermined time interval.

8. A current overload protection circuit for an electrical component comprising: a current operated relay including an energizing coil, a first normally closed contact, and a first and second normally opened contact, and a first and second movable common contact, said relay coil being connected in the current path of said component and with opposing ends connected to said first movable contact and said second normally opened contact respectively; a first electrical power supply means connected between a point of constant potential and said first normally closed contact; a second and lower voltage electrical power supply means connected between a point of constant potential and said first normally opened contact; and a capacitor connected between said point of constant potential and said second movable conact.

References Cited by the Examiner

UNITED STATES PATENTS

| | | | |
|---|---|---|---|
| 1,629,332 | 5/27 | Axtell | 307—64 |
| 1,708,886 | 4/29 | Jackson | 317—22 X |
| 1,756,858 | 4/30 | Gittings | 317—22 X |
| 1,872,362 | 8/32 | Tanberg | 317—51 X |
| 2,039,027 | 4/36 | Perrott | 328—9 X |
| 2,101,166 | 12/37 | Crago | 317—141 |
| 2,172,950 | 9/39 | Anderson | 317—22 |
| 2,473,344 | 6/49 | McCown | 317—22 |
| 2,654,052 | 9/53 | Mayer | 317—22.1 |
| 2,678,391 | 5/54 | Lappin | 328—10 |
| 2,815,445 | 12/57 | Yucht | 328—9 |

SAMUEL BERNSTEIN, *Primary Examiner.*

UNITED STATES PATENT OFFICE

CERTIFICATE OF CORRECTION

Patent No. 3,207,992 September 21, 1965

Walter Schreuer et al.

It is hereby certified that error appears in the above numbered patent requiring correction and that the said Letters Patent should read as corrected below.

Column 2, line 16, for "of", first occurrence, read -- or --; column 4, line 48, for "is", first occurrence, read -- in --; line 71, for "energized" read -- energizing --; column 6, lines 14 and 15, strike out "controlling the current in said relay for", and insert the same before "maintain-" in line 13, same column 6.

Signed and sealed this 10th day of May 1966.

(SEAL)
Attest:

ERNEST W. SWIDER
Attesting Officer

EDWARD J. BRENNER
Commissioner of Patents